United States Patent
Yoon et al.

(10) Patent No.: US 12,438,182 B2
(45) Date of Patent: Oct. 7, 2025

(54) NEGATIVE ELECTRODE FOR LITHIUM SECONDARY BATTERY, AND METHOD FOR MANUFACTURING SAME

(71) Applicant: LG Energy Solution, Ltd., Seoul (KR)

(72) Inventors: Jong Su Yoon, Daejeon (KR); Taek Soo Lee, Daejeon (KR); Jin Ho Cho, Daejeon (KR); Shin Wook Jeon, Daejeon (KR); Young Gon Kim, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 18/854,779

(22) PCT Filed: Nov. 27, 2023

(86) PCT No.: PCT/KR2023/019192
§ 371 (c)(1),
(2) Date: Oct. 7, 2024

(87) PCT Pub. No.: WO2024/122955
PCT Pub. Date: Jun. 13, 2024

(65) Prior Publication Data
US 2025/0112264 A1    Apr. 3, 2025

(30) Foreign Application Priority Data

Dec. 7, 2022  (KR) .................. 10-2022-0169280
Jun. 15, 2023 (KR) .................. 10-2023-0076626

(51) Int. Cl.
*H01M 4/02*  (2006.01)
*H01M 4/04*  (2006.01)
(Continued)

(52) U.S. Cl.
CPC ..... *H01M 10/0525* (2013.01); *H01M 4/0404* (2013.01); *H01M 4/366* (2013.01);
(Continued)

(58) Field of Classification Search
None
See application file for complete search history.

(56) References Cited

U.S. PATENT DOCUMENTS 6,420,070 B1   7/2002   Kasamatsu et al.
11,177,477 B2  11/2021  Kang et al.
(Continued)

FOREIGN PATENT DOCUMENTS

EP    3561914 A1   10/2019
EP    3872904 A1    9/2021
(Continued)

OTHER PUBLICATIONS

International Search Report for Application No. PCT/KR2023/019192 mailed Feb. 29, 2024, pp. 1-3.
(Continued)

*Primary Examiner* — Zhongqing Wei
(74) *Attorney, Agent, or Firm* — Lerner David LLP

(57) ABSTRACT

A negative electrode for a lithium secondary battery includes a carbon-based negative electrode active material and a silicon-based negative electrode active material together as a negative electrode active material. The negative electrode exhibits excellent characteristics of charge and discharge capacity and energy density. Furthermore, the negative electrode has the advantage of exhibiting high charge characteristics and life characteristics during long-term charge and discharge by realizing the alignment ($O.I_a$) of the carbon-based negative electrode active material after activation in a predetermined range that is lower than the alignment ($O.I_r$) of the carbon-based negative electrode active material before activation. A lithium secondary battery including the negative electrode is also provided. Further, methods of manufacturing the negative electrode and the lithium secondary battery are also provided.

11 Claims, 1 Drawing Sheet

(51) Int. Cl.
  *H01M 4/36* (2006.01)
  *H01M 4/38* (2006.01)
  *H01M 4/505* (2010.01)
  *H01M 4/525* (2010.01)
  *H01M 4/583* (2010.01)
  *H01M 10/0525* (2010.01)

(52) U.S. Cl.
  CPC ........... *H01M 4/386* (2013.01); *H01M 4/505* (2013.01); *H01M 4/525* (2013.01); *H01M 4/583* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2013/0337325 A1 | 12/2013 | Jung et al. | |
| 2014/0349180 A1* | 11/2014 | Kim | H01M 4/587 429/211 |
| 2018/0151867 A1* | 5/2018 | Lim | H01M 4/0435 |
| 2019/0326598 A1 | 10/2019 | Lee et al. | |
| 2019/0334161 A1 | 10/2019 | Lee et al. | |
| 2019/0348678 A1 | 11/2019 | Peng et al. | |
| 2021/0159488 A1 | 5/2021 | Choi et al. | |
| 2022/0140343 A1 | 5/2022 | Park et al. | |
| 2022/0263063 A1 | 8/2022 | Lee et al. | |
| 2022/0352543 A1 | 11/2022 | Cheong et al. | |

FOREIGN PATENT DOCUMENTS

| | | | |
|---|---|---|---|
| JP | 2014086258 A | 5/2014 | |
| JP | 2018129212 A | 8/2018 | |
| JP | 2019185943 A | 10/2019 | |
| JP | 2022074139 A | 5/2022 | |
| JP | 2022530081 A | 6/2022 | |
| JP | 2022167890 A | 11/2022 | |
| KR | 20130135071 A | 12/2013 | |
| KR | 20190122437 A | 10/2019 | |
| KR | 20200047287 A | 5/2020 | |
| KR | 20220100825 A | 7/2022 | |
| KR | 20220146194 A | 11/2022 | |
| WO | 2022102724 A1 | 5/2022 | |

OTHER PUBLICATIONS

Etzler, F. M. et al., "Particle Size Analysis: a Comparative Study of Various Methods" Particle & Particle Systems Characterization, Oct. 1995, pp. 217-224, vol. 12, Issue 5.

Extended European Search Report including Written Opinion for Application No. 23900974.9 dated Apr. 22, 2025, pp. 1-10.

* cited by examiner

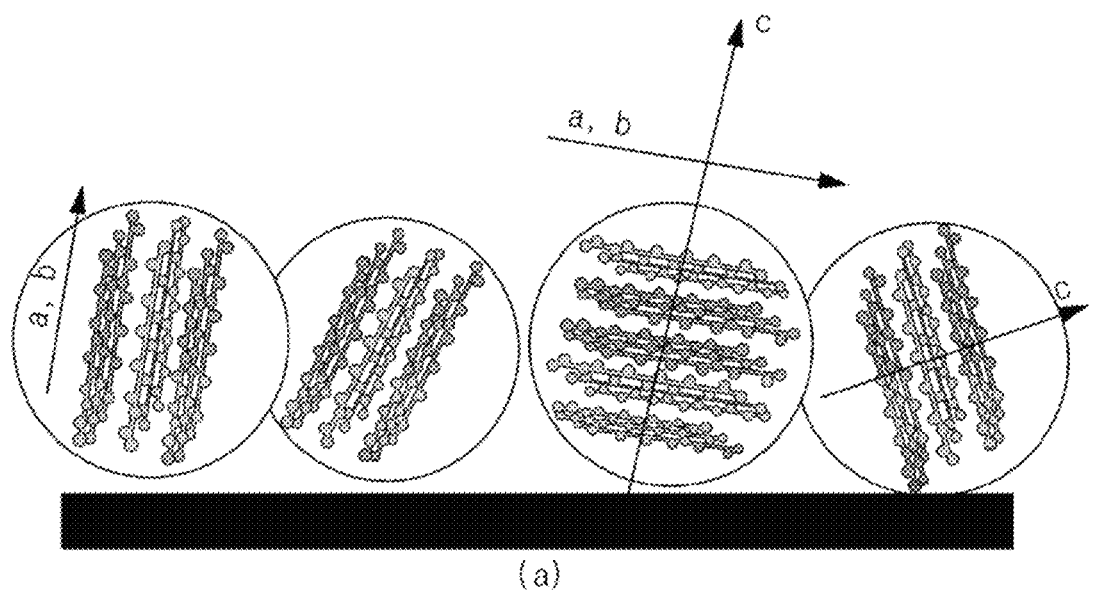
(a)
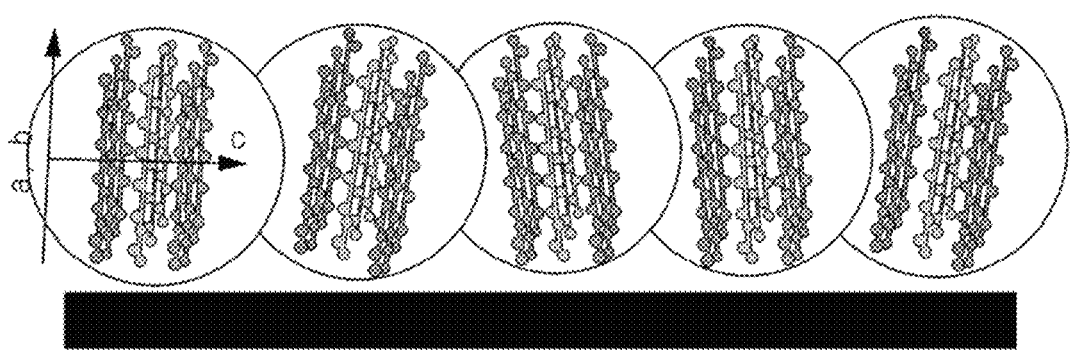
(b)

NEGATIVE ELECTRODE FOR LITHIUM SECONDARY BATTERY, AND METHOD FOR MANUFACTURING SAME

CROSS-REFERENCE TO RELATED APPLICATIONS

The present application is a national phase entry under 35 U.S.C. § 371 of International Application No. PCT/KR2023/019192 filed Nov. 27, 2023, which claims priority to Korean Patent Application No. 10-2022-0169280, filed on Dec. 7, 2022, and Korean Patent Application No. 10-2023-0076626, filed on Jun. 15, 2023, the disclosures of which are incorporated herein by reference in their entirety.

TECHNICAL FIELD

The present disclosure relates to a negative electrode for a lithium secondary battery, and to a lithium secondary battery having excellent charge and discharge characteristics and life characteristics by including the same.

BACKGROUND

In recent years, lithium secondary batteries have been widely applied not only in small devices such as portable electronics, but also in medium and large devices such as battery packs or power storage in hybrid and electric vehicles. As a result, research is being conducted on batteries that can meet various needs. In particular, lithium secondary batteries with high energy density and excellent life and cycle characteristics are being actively researched as a power source for medium and large-sized devices.

A lithium secondary battery is a rechargeable power generation device consisting of a laminated structure of a positive electrode, separator, and negative electrode. When a lithium secondary battery is charged, a lithium deintercalation reaction is induced at the positive electrode inside the battery, where lithium contained in the positive electrode active material is oxidized and released, and a lithium intercalation reaction occurs at the negative electrode, where lithium is reduced and enters the negative electrode active material. In general, the performance of lithium secondary battery is mainly determined by the charging rate at the negative electrode, as the deintercalation reaction at the positive electrode active material is faster than the intercalation reaction at the negative electrode active material.

Carbon materials, including graphite as the negative electrode active material of the negative electrode, are widely used. For example, graphite has a layered structure in which layers of carbon atoms formed in a reticulated structure are stacked. Accordingly, the graphite is capable of allowing lithium ions to enter the edge face (the surface where the layers are overlapped) of the carbon layer during charging and diffuse between the layers, and to release the diffused lithium ions from the edge face of the carbon layer during discharge by deintercalation. In addition, graphite has a lower electrical resistivity in the face direction of the carbon layer than in the stacking direction of the carbon layer, so a conduction path for diverted electrons is formed along the face direction of the carbon layer.

In this regard, a technique for orienting the graphite contained in the negative electrode in a magnetic field to improve the charging performance of the negative electrode of a lithium secondary battery utilizing carbon materials such as graphite has been proposed in the art. Specifically, it has a configuration in which the [0,0,2] crystal face of graphite is oriented in a magnetic field during negative electrode formation so that it is almost vertical with respect to the negative electrode current collector and is fixed. In this case, the manufactured negative electrode has the edge face of the carbon layer of graphite facing the positive electrode active layer, which facilitates the intercalation and deintercalation of lithium ions while shortening the conduction path of electrons, thereby improving the electronic conductivity of the negative electrode, which can improve the charging performance of the battery.

Meanwhile, when carbon materials such as graphite release lithium, the average potential is about 0.2 V (based on Li/Li$^+$), and the discharge potential is relatively flat. For this reason, negative electrode containing graphite as a negative electrode active material have the advantage that the voltage of the secondary battery is high and constant. The electrical capacity per unit mass of such carbon materials such as graphite is theoretically 372 mAh/g. However, since the capacity of the carbon material is improved close to the theoretical capacity, it is difficult to further increase the capacity, and there is a limitation that it is difficult to increase the energy density of the manufactured negative electrode.

Therefore, various negative electrode active materials are being researched to improve the high capacity and energy density of lithium secondary batteries. For example, silicon materials such as silicon (Si) and silicon oxide (SiO$_2$) have been studied recently as it has been found that silicon materials can reversibly adsorb and release large amounts of lithium through compound formation reactions with lithium. Silicon materials have a theoretical maximum capacity of about 4020 mAh/g (9800 mAh/cc, specific gravity 2.23). This is a very large value compared to graphite-based materials, which means that silicon is useful as a high energy density and/or high capacity negative electrode material compared to graphite-based materials. However, silicon materials exhibit a large volume change (~300%) during charge and discharge. Therefore, a negative electrode including a carbon material and a silicon material as a negative electrode active material has a high energy density of the electrode, but has a limitation of low durability due to a significant decrease in adhesion between the negative electrode active layer and the negative electrode current collector. In particular, when the negative electrode is oriented such that the [0,0,2] crystal face of graphite is nearly horizontal with respect to the negative electrode current collector, the carbon layer edge face arrangement of the carbon material is significantly damaged and/or lost due to the large volume change of the silicon material. As a result, the negative electrode has a limitation that the charging characteristics and life characteristics of the negative electrode are significantly degraded when performing long-term charge and discharge.

Therefore, there is a high need for negative electrode technologies for lithium secondary batteries that include a combination of carbon and silicon materials as negative electrode active materials, which not only have excellent charge and discharge capacity and energy density, but also exhibit high charging characteristics and life characteristics during long-term charge and discharge.

RELATED-ART DOCUMENT

Patent Document

Korean Registered Patent Publication No. 10-2020-0047287

Technical Problem

An object of the present disclosure is to provide a negative electrode for a lithium secondary battery, and a lithium secondary battery comprising the negative electrode, which includes a carbon material and a silicon material together as the negative electrode active material, having excellent charge and discharge capacity and energy density, and exhibiting high charging characteristics and life characteristics even during long-term charge and discharge.

Technical Solution

To resolve the issues described above,
in an exemplary embodiment, the present disclosure provides a negative electrode for lithium secondary battery including:
a negative electrode current collector, and
a negative electrode active layer provided on at least one side of the negative electrode current collector and including a carbon-based negative electrode active material and a silicon-based negative electrode active material,
wherein the negative electrode active layer has the alignment of the carbon-based negative electrode active material after activation ($O.I_a$) of 3 or less, and satisfies Equation 1 below:

$$0.5 \leq [O.I_a]/[O.I_r] < 1.0 \qquad \text{[Equation 1]}$$

in Equation 1,
$O.I_r$ represents the alignment (O.I) of the carbon-based negative electrode active material measured prior to activation,
$O.I_a$ represents the alignment (O.I) of the carbon-based negative electrode active material measured after activation, and
wherein the alignment (O.I) represents the ratio of the area integrals of the peak at $2\theta=54.7\pm0.2°$, representing the [0,0,4] face, and the peak at $2\theta=77.5\pm0.2°$, representing the [1,1,0] face, in X-ray diffraction spectroscopy analysis of the negative electrode active layer.

Here, an average particle diameter (Dc) of the carbon-based negative electrode active material is between 5 μm and 50 μm, an average particle diameter (Ds) of the silicon-based negative electrode active material is between 0.5 μm and 10 μm, and an average particle diameter ratio (Dc/Ds) of the carbon-based negative electrode active material and silicon-based negative electrode active material may be 1 to 10.

In addition, the silicon-based negative electrode active material may be included in an amount of 1 wt. % to 20 wt. % based on a total weight of the negative electrode active material.

Moreover, the carbon-based negative electrode active material may include one or more of natural graphite or synthetic graphite.

In addition, the silicon-based negative electrode active material may include one or more of silicon (Si), silicon carbide (SiC), or silicon oxide ($SiO_q$, where $0.8 \leq q \leq 2.5$).

Furthermore, the negative electrode active layer may have a loading amount of 150 mg/25 cm² to 300 mg/25 cm², and an average thickness of 10 μm to 100 μm.

In addition, in an exemplary embodiment, the present disclosure provides a manufacturing method of a negative electrode for lithium secondary battery including:
applying a negative electrode slurry including a carbon-based negative electrode active material and a silicon-based negative electrode active material to at least one side of the negative electrode current collector,
applying a magnetic field to the applied negative electrode slurry, and
drying and rolling a negative electrode slurry applied with a magnetic field to form a negative electrode active layer,
wherein the negative electrode active layer has the alignment of the carbon-based negative electrode active material after activation ($O.I_a$) of 3 or less, and satisfies Equation 1 below:

$$0.5 \leq [O.I_a]/[O.I_r] < 1.0 \qquad \text{[Equation 1]}$$

in Equation 1,
$O.I_r$ represents the alignment (O.I) of the carbon-based negative electrode active material measured prior to activation,
$O.I_a$ represents the alignment (O.I) of the carbon-based negative electrode active material measured after activation, and
wherein the alignment (O.I) represents the ratio of the area integrals of the peak at $2\theta=54.7\pm0.2°$, representing the [0,0,4] face, and the peak at $2\theta=77.5\pm0.2°$, representing the [1,1,0] face, in X-ray diffraction spectroscopy analysis of the negative electrode active layer.

Here, the step of applying a magnetic field may be performed with a magnetic field strength of 3,000 G to 9,000 G, and may be performed for 1 second to 30 seconds.

Moreover, the rolling may be performed under the conditions of a temperature of 20° C. to 35° C. and a pressure of 50 MPa to 200 MPa.

In addition, in an exemplary embodiment, the present disclosure provides a lithium secondary battery provided with an electrode assembly comprising a positive electrode, a negative electrode according to the present disclosure, and a separator disposed between the positive electrode and negative electrode.

Here, the positive electrode may comprise a positive electrode current collector and a positive electrode active layer provided on at least one side of the positive electrode current collector and including at least one positive electrode active material among lithium metal oxides represented by Chemical Formula 1 or Chemical Formula 2 below:

$$Li_x[Ni_yCo_zMn_wM^1_v]O_2 \qquad \text{[Chemical Formula 1]}$$

$$LiM^2_pMn_{1-p}O_4 \qquad \text{[Chemical Formula 2]}$$

in Chemical Formula 1 and Chemical Formula 2,
$M^1$ is at least one element of W, Cu, Fe, V, Cr, Ti, Zr, Zn, Al, In, Ta, Y, La, Sr, Ga, Sc, Gd, Sm, Ca, Ce, Nb, Mg, B, or Mo, x, y, z, w, and v are 1.0≤x≤1.30, 0.5≤y<1, 0<z≤0.3, 0<w≤0.3, and 0≤v≤0.1, respectively, where y+z+w+v=1, $M^2$ is Ni, Co, or Fe, and p is 0.05≤p≤1.0.

Furthermore, in an exemplary embodiment, provides a manufacturing method of lithium secondary battery including:

activating a lithium secondary battery including an electrode assembly comprising a positive electrode, a negative electrode according to the present disclosure, and a separator disposed between the positive electrode and negative electrode;

wherein the negative electrode active layer has the alignment of the carbon-based negative electrode active material after activation (O.I$_a$) of 3 or less, and satisfies Equation 1 below:

$$0.5 \le [O.I_a]/[O.I_r] < 1.0 \qquad \text{[Equation 1]}$$

in Equation 1,

O.I$_r$ represents the alignment (O.I) of the carbon-based negative electrode active material measured prior to activation, O.I$_a$ represents the alignment (O.I) of the carbon-based negative electrode active material measured after activation, and wherein the alignment (O.I) represents the ratio of the area integrals of the peak at 2θ=54.7±0.2°, representing the [0,0,4] face, and the peak at 2θ=77.5±0.2°, representing the [1,1,0] face, in X-ray diffraction spectroscopy analysis of the negative electrode active layer.

Here, the activation process may be performed by charging and discharging at least two times at a rate of 0.01 C to 0.9 C.

Advantageous Effects

The negative electrode for a lithium secondary battery according to the present disclosure includes a carbon-based negative electrode active material and a silicon-based negative electrode active material together as a negative electrode active material, and exhibits excellent characteristics of charge and discharge capacity and energy density. Furthermore, the negative electrode has the advantage of exhibiting high charge characteristics and life characteristics during long-term charge and discharge by realizing the alignment (O.I$_a$) of the carbon-based negative electrode active material after activation in a predetermined range that is lower than the alignment (O.I$_r$) of the carbon-based negative electrode active material before activation.

BRIEF DESCRIPTION OF THE DRAWINGS

FIGURE is an image showing the alignment of the ab-axis crystal faces of graphite according to whether or not a magnetic field is applied to the negative electrode slurry during the formation of the negative electrode active layer, where (a) of FIGURE is a case in which the crystal faces of graphite are not aligned because no magnetic field is applied, and (b) of FIGURE is a case in which the crystal faces of graphite are aligned because a magnetic field is applied.

DETAILED DESCRIPTION

The present disclosure is subject to various modifications and can have many embodiments, certain of which are described in detail below.

However, this is not intended to limit the present disclosure to any particular embodiment and is to be understood to include all modifications, equivalents, or substitutions that fall within the scope of the thought and technology of the present disclosure.

The terms "comprise" or "have" are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, a film, a region or a plate is disposed "on" another part, this includes not only a case in which one part is disposed "directly on" another part, but a case in which a third part is interposed there between. In contrast, when a part of a layer, a film, a region or a plate is disposed "under" another part, this includes not only a case in which one part is disposed "directly under" another part, but a case in which a third part is interposed there between. In addition, in this application, "on" may include not only a case of disposed on an upper part but also a case of disposed on a lower part.

Further, in the present disclosure, "comprising as a major component" may mean comprising 50 wt. % or more (or 50 volume % or more), 60 wt. % or more (or 60 volume % or more), 70 wt. % or more (or 70 volume % or more), 80 wt. % or more (or 80 volume % or more), 90 wt. % or more (or 90 volume % or more), or 95 wt. % or more (or 95 volume % or more) of the defined component relative to the total weight (or total volume). For example, "comprising graphite as the major component of the negative electrode active material" may mean comprising at least 50 wt. %, at least 60 wt. %, at least 70 wt. %, at least 80 wt. %, at least 90 wt. %, or at least 95 wt. % graphite based on the total weight of the negative electrode active material, and in some cases may mean that the entire negative electrode active material is composed of graphite and comprises 100% graphite.

Further, as used herein, "carbon-based negative electrode active material is oriented" or "carbon-based negative electrode active material is aligned" may mean that certain crystal faces (e.g., a-b axis crystal faces of graphite) representing the two-dimensional planar structure of the carbon-based negative electrode active material comprising the negative electrode active material particles are arranged to have a predetermined slope relative to the surface of the negative electrode current collector. This may be different from the carbon-based negative electrode active material particles themselves being oriented in a certain direction within the negative electrode active layer.

In addition, "highly oriented carbon-based negative electrode active material" may mean that certain crystal faces (e.g., a-b axis crystal faces of graphite) representing the two-dimensional planar structure of the carbon-based negative electrode active material contained in the negative electrode active layer have a high frequency of having a predetermined slope relative to the negative electrode current collector surface. It may also mean, in some cases, that the crystal faces of the carbon-based negative electrode active material contained in the negative electrode active layer are arranged at a high angle (e.g., a near-vertical angle, greater than 45°; specifically, greater than 60°) relative to the negative electrode current collector surface.

In addition, "high alignment of the carbon-based negative electrode active material" means that the "alignment (O.I)" referred to herein has a large value, which may mean that certain crystal faces (e.g., a-b axis crystal faces of graphite) representing the two-dimensional planar structure of the carbon-based negative electrode active material contained in the negative electrode active layer are arranged at a low angle (e.g., less than) 45° relative to the surface of the negative electrode current collector. Conversely, "low alignment of the carbon-based negative electrode active material" may mean that the "alignment (O.I)" has a small value, such that the crystal faces of the carbon-based negative electrode active material contained in the negative electrode active layer are arranged at a high angle (e.g., an angle close to vertical, greater than 45°; specifically, greater than 60°) relative to the surface of the negative electrode current collector.

Furthermore, as used herein, "crystal face of a carbon-based negative electrode active material" refers to a face on which the atoms of the carbon-based negative electrode active material form the shape of a crystal. In the present disclosure, it can mean a crystal face including a plane of a carbon-based negative electrode active material, or a crystal face including an a-axis/b-axis/ab-axis of a carbon-based negative electrode active material crystal.

Also, as used herein, "average particle diameter $(D_{50})$" means the particle diameter for which the integrated value is 50% in the particle diameter distribution of the particles, which is also referred to as the median diameter.

The present disclosure will be described in more detail below.

Negative Electrode for Lithium Secondary Battery

In an exemplary embodiment, the present disclosure provides a negative electrode for a lithium secondary battery including:

a negative electrode current collector, and a negative electrode active layer provided on at least one side of the negative electrode current collector and including a carbon-based negative electrode active material and a silicon-based negative electrode active material, wherein the negative electrode active layer has the alignment of the carbon-based negative electrode active material after activation $(O.I_a)$ of 3 or less, and satisfies Equation 1 below:

$$0.5 \leq [O.I_a]/[O.I_r] < 1.0 \quad \text{[Equation 1]}$$

in Equation 1, $O.I_r$ represents the alignment (O.I) of the carbon-based negative electrode active material measured prior to activation, $O.I_a$ represents the alignment (O.I) of the carbon-based negative electrode active material measured after activation, and wherein the alignment (O.I) represents the ratio of the area integrals of the peak at 2θ=54.7±0.2°, representing the [0,0,4] face, and the peak at 2θ=77.5±0.2°, representing the [1,1,0] face, in X-ray diffraction spectroscopy analysis of the negative electrode active layer.

A negative electrode for a lithium secondary battery according to the present disclosure includes a negative electrode current collector and a negative electrode active layer on at least one side of the negative electrode current collector. The negative electrode active layer is a layer that implements the electrical activity of the negative electrode, and includes a negative electrode active material that implements an electrochemical redox reaction during charging and discharging of the battery.

Here, the present disclosure includes a carbon-based negative electrode active material having carbon atoms as the main component and a silicon-based negative electrode active material having silicon atoms as the main component as the negative electrode active material included in the negative electrode active layer.

The carbon-based negative electrode active material may have a layered structure in which layers of carbon atoms formed in a network structure are stacked. In a carbon-based negative electrode active material with such a structure, lithium ions can be diffused between the layers by entering the edge face (the face where the layers are stacked) of the carbon layer during charging, and the diffused lithium ions during discharge can be released from the edge face of the carbon layer by deintercalation. Since the electrical resistivity of the carbon-based negative electrode active material is lower in the face direction of the carbon layer than in the stacking direction of the carbon layer, a conduction path for diverted electrons is formed along the face direction of the carbon layer.

Accordingly, the present disclosure shortens the ion path of lithium ions by controlling the crystal structure characteristics of the carbon-based negative electrode active material contained in the negative electrode active layer, and exhibits excellent charging performance by reducing the resistance in the face direction of the carbon layer.

In one example, the carbon-based negative electrode active material contained in the negative electrode active layer may have an alignment $(O.I_a)$ of 3.0 or less, which represents the degree of inclination of the ab-axis crystal face with respect to the negative electrode current collector. Here, the alignment O.I is a value of the alignment that is calculated after activation of the secondary battery, which can be calculated by Equation 3 below:

$$O.I = I_{004}/I_{110} \quad \text{[Equation 3]}$$

in Equation 3, $I_{004}$ represents the area of the peak representing the [0,0,4] crystal face in an X-ray diffraction spectroscopy (XRD) measurement of the negative electrode active layer, and $I_{110}$ represents the area of the peak representing the [1,1,0] crystal face in an X-ray diffraction (XRD) measurement of the negative electrode active layer.

The alignment (O.I) of the carbon-based negative electrode active material may be an indicator of the degree to which the ab-axis crystal face of the carbon-based negative electrode active material is oriented in a certain direction, specifically with respect to the surface of the negative electrode current collector, when measured by X-ray diffraction (XRD). Specifically, the negative electrode active layer exhibits peaks at 2θ=26.5±0.2°, 42.4±0.2°, 43.4±0.2°, 44.6±0.2°, 54.7±0.2°, and 77.5±0.2° for graphite, a carbon-based negative electrode active material, in X-ray diffraction measurements. These represent the (0,0,2), (1,0,0), (1,0,1)R, (1,0,1) H, (0,0,4), and (1,1,0) faces of graphite. The peak at 2θ=43.4±0.2° can also be seen as an overlap of the peaks corresponding to the (1,0,1)R face of the carbon-based negative electrode active material and the (1,1,1) face of the current collector, for example, copper (Cu).

Of these, the ratio of the area obtained by integrating the respective intensities of the peak at 2θ=54.7±0.2° representing the (0,0,4) face and the peak at 2θ=77.5±0.2° representing the (1,1,0) face can be used to measure the alignment (O.I) of the carbon-based negative electrode active material.

Since the peak at 2θ=54.7±0.2° is a peak representing a crystalline plane of the carbon-based negative electrode active material having a slope with the negative electrode current collector, the alignment (O.I) may mean that the slope with respect to the surface of the negative electrode current collector is closer to 90° when the value is close to 0, and the slope with respect to the surface of the negative electrode current collector is closer to 0° or 180° when the value is larger. In other words, the negative electrode active layer according to the present disclosure may be aligned such that the carbon-based negative electrode active material has an angle of 60° or more, 70° or more, 70°-90°, 80°-90°, 65°-85°, or 70°-85° with respect to the negative electrode current collector. Accordingly, the negative electrode active layer may have a lower alignment (O.I) of the carbon-based negative electrode active material compared to a case where the carbon-based negative electrode active material is aligned at a lower angle of less than 60°.

As an example, the negative electrode active layer may have an alignment $(O.I_a)$ of the carbon-based negative electrode active material of 3.0 or less, more specifically, 0.1 to 3.0; 0.5 to 2.9; 1.0 to 2.9; 1.5 to 2.9; 1.8 to 2.9; 1.7 to 2.7; 1.8 to 2.3; 2.2 to 2.8; or 1.9 to 2.5. Here, the alignment (O.I) indicates the degree of alignment of the ab-axis crystal faces of the carbon-based negative electrode active material, and does not indicate the degree to which the carbon-based negative electrode active material particles are aligned by rotating themselves within the active layer.

Furthermore, the negative electrode active layer includes a silicon-based negative electrode active material. The silicon-based negative electrode active material has a theoretical maximum capacity of about 4020 mAh/g, which is useful as a high energy density and/or high capacity negative electrode material. However, silicon-based negative electrode active materials exhibit large volume changes (~300%) during charge and discharge, which can reduce the durability of the electrode. In particular, silicon-based negative electrode active materials can significantly damage and/or lose their arrangement during charge and discharge when the ab-axis crystal faces of carbon-based negative electrode active materials are oriented to be nearly horizontal with respect to the negative electrode current collector in order to improve the charging performance of the negative electrode active layer. Such orientation impairment of the carbon-based negative electrode active material can significantly degrade the charging characteristics and life characteristics of the negative electrode during long-term charge and discharge of the secondary battery.

However, the negative electrode according to the present disclosure can overcome the problems caused by silicon-based negative electrode active materials by implementing the alignment $(O.I_a)$ of the carbon-based negative electrode active material after activation lower than the alignment $(O.I_r)$ of the carbon-based negative electrode active material before activation.

In one example, the negative electrode may satisfy Equation 1 by an alignment $(O.I_a)$ of the carbon-based negative electrode active material after activation that is less than an alignment $(O.I_r)$ of the carbon-based negative electrode active material before activation, such that the alignment ratio is 0.5 or more and less than 1:

$$0.5 \leq [O.I_a]/[O.I_r] < 1.0 \quad \text{[Equation 1]}$$

In Equation 1,
$O.I_r$ represents the alignment (O.I) of the carbon-based negative electrode active material measured prior to activation,
$O.I_a$ represents the alignment (O.I) of the carbon-based negative electrode active material measured after activation, and
the alignment (O.I) represents the ratio of the area integrals of the peak at 2θ=54.7±0.2°, representing the [0,0,4] face, and the peak at 2θ=77.5±0.2°, representing the [1,1,0] face, in X-ray diffraction spectroscopy analysis of the negative electrode active layer.

Equation 1 indicates that after activation, the ab-axis crystal face of the carbon-based negative electrode active material is aligned at a higher slope with respect to the negative electrode current collector. In other words, the orientation of the carbon-based negative electrode active material in the negative electrode active layer is improved by the activation of the secondary battery.

Activation is the step of electrically activating a lithium secondary battery, which provides a pathway for lithium ions to migrate through the negative electrode active layer during charge and discharge. The lithium ions are intercalated between the layers of the carbon-based negative electrode active material and the crystals of the silicon-based negative electrode active material during charging, and deintercalated during discharging. Therefore, activation can be defined as the process of securing a path for such intercalation and deintercalation of lithium ions. Here, the carbon-based negative electrode active material may have the characteristic that the ab-axis crystal face is oriented at a high slope close to vertical with respect to the negative electrode current collector, as shown in FIGURE, which shortens the path for the lithium ions generated from the positive electrode active layer to travel. However, if the secondary battery is subjected to long-term charge and discharge, volume changes due to intercalation and deintercalation of lithium ions in the carbon-based negative electrode active material may occur continuously. In addition, the silicon-based negative electrode active material located between the carbon-based negative electrode active materials expands in volume due to the intercalation of lithium ions during charging. This contraction and expansion of the negative electrode active materials can lower the slope of the crystal faces of the carbon-based negative electrode active materials with respect to the negative electrode current collector.

Accordingly, the negative electrode of the present disclosure is capable of securing a migration path for lithium ions while minimizing damage and/or loss of the slope of the ab-axis crystal face of the carbon-based negative electrode active material contained in the negative electrode active layer with respect to the negative electrode current collector during activation. The migration path of the lithium ions thus secured is robust, so that even if a long-term charge and discharge of the secondary battery is performed, the deformation is small, and the possibility of damage and/or loss of alignment of the carbon-based negative electrode active material in the negative electrode active layer is significantly reduced.

Such a negative electrode of the present disclosure may be implemented such that the alignment $(O.I_a)$ of the carbon-based negative electrode active material after activation is lower than the alignment $(O.I_r)$ of the carbon-based negative electrode active material before activation, thereby satisfying Equation 1 by greater than or equal to 0.5 and less than 1.0 (i.e., $0.5 \leq [O.I_a]/[O.I_r] < 1.0$). Specifically, the negative electrode may satisfy Equation 1 with greater than or equal to 0.5 and less than or equal to 0.95 (i.e., $0.5 \leq [O.I_a]/[O.I_r] \leq 0.95$), and more specifically, the negative electrode may satisfy Equation 1 with greater than or equal to 0.6 and less than or equal to 0.95 (i.e., $0.6 \leq [O.I_a]/[O.I_r] \leq 0.95$); 0.65 to 0.75 (i.e., $0.65 \leq [O.I_a]/[O.I_r] \leq 0.75$); 0.85 to 0.95 (i.e., $0.85 \leq [O.I_a]/[O.I_r] \leq 0.95$); 0.70 to 0.93 (i.e., $0.70 \leq [O.I_a]/[O.I_r] \leq 0.93$); or 0.72 to 0.90 (i.e., $0.72 \leq [O.I_a]/[O.I_r] \leq 0.90$). Accordingly, the negative electrode according to the present disclosure exhibits excellent charging characteristics and life characteristics during long-term charge and discharge of the secondary battery.

In addition, the present disclosure can control the type of carbon-based negative electrode active material and silicon-based negative electrode active material comprising the negative electrode active layer, the shape, the particle diameter, the content, etc. in the negative electrode active layer to satisfy predetermined conditions in order to secure the migration path of lithium ions in the negative electrode active layer during activation of the secondary battery.

First, the carbon-based negative electrode active material may include graphite. The graphite may include either natural graphite or synthetic graphite. For example, the carbon-based negative electrode active material may include natural graphite or synthetic graphite alone, or in some cases, a mixture of natural and synthetic graphite. In this case, the ratio of natural graphite to synthetic graphite may be 5 to 50:50 to 95, or 10 to 40:60 to 90, based on weight. By including natural graphite and synthetic graphite in the mixing ratio as described above, the carbon-based negative electrode active material can implement a high orientation of the carbon-based negative electrode active material with respect to the surface of the negative electrode current collector while strengthening the adhesion of the negative electrode current collector and the negative electrode active layer.

In one example, the carbon-based negative electrode active material may include natural graphite and synthetic graphite in a weight ratio of 10 to 30:70 to 90.

In another example, the carbon-based negative electrode active material may include natural graphite and synthetic graphite in a weight ratio of 25 to 45:55 to 75.

In yet another example, the carbon-based negative electrode active material may include synthetic graphite alone.

Furthermore, the carbon-based negative electrode active material is preferably a spherical graphite assembly formed by the aggregation of a plurality of flaky graphite. Flaky graphite includes natural graphite, synthetic graphite, mesophase calcined carbon (bulk mesophase) based on tar and pitch, graphitized coke (raw coke, green coke, pitch coke, needle coke, petroleum coke, etc.), and the like, and is preferably assembled using a plurality of highly crystalline natural graphite. Furthermore, one graphite assembly may be formed by assembling from 2 to 100, preferably from 3 to 20, pieces of flaky graphite.

Such a carbon-based negative electrode active material may have a spherical particle shape. In this case, the sphericity of the graphite particles may be greater than or equal to 0.75, for example, 0.75 to 1.0; 0.75 to 0.95; 0.8 to 0.95; or 0.90 to 0.99. As used herein, "sphericity" may mean the ratio of the shortest diameter (short diameter) to the longest diameter (long diameter) of any diameter passing through the center of the particle. A sphericity of 1 means that the shape of the particle is spherical. The sphericity may be determined by measuring the sphericity using a particle shape analyzer, or by measuring the shape of the particle using a scanning electron microscope (SEM), an energy dispersive spectrometer, or the like, and then analyzing the measured results.

The present disclosure can implement a high electrical conductivity of the negative electrode active layer by implementing a shape of the carbon-based negative electrode active material close to a spherical shape. Therefore, the negative electrode including a spherical carbon-based negative electrode active material can improve the capacity of a secondary battery, and has the advantage of increasing the specific surface area per unit weight of the negative electrode active material, which can improve the adhesion between the negative electrode active layer and the current collector.

In addition, examples of silicon-based negative electrode active material may include silicon (Si), silicon carbide (SiC), silicon monoxide (SiO) or silicon dioxide ($SiO_2$), which may be included in the negative electrode active layer alone or in combination. When silicon monoxide (SiO) and silicon dioxide ($SiO_2$) are homogeneously mixed or compounded and included in the negative electrode active layer as silicon-based negative electrode active materials, they may be labeled as silicon oxide ($SiO_q$, where $0.8 \leq q \leq 2.5$).

Furthermore, the silicon-based negative electrode active material may be doped or alloyed with Li, Mg, Al, Ca, Ti, or the like. Furthermore, the silicon-based negative electrode active material may be surface treated with a carbon coating layer or the like for the purpose of suppressing volume expansion during charging in the presence of oxygen (O) while improving the electrical conductivity of the negative electrode active material.

Furthermore, the carbon-based negative electrode active material and silicon-based negative electrode active material in the negative electrode active layer, i.e., the total negative electrode active material, may be included to be at least 85 parts by weight of the negative electrode active layer, and more specifically, at least 90 parts by weight, at least 93 parts by weight, or at least 95 parts by weight.

Furthermore, the silicon-based negative electrode active material may be included in an amount of 1 wt. % to 20 wt. % with respect to the total weight of the total negative electrode active material, more particularly from 5 wt. % to 20 wt. %, from 1 wt. % to 9 wt. %, from 5 wt. % to 15 wt. %, from 3 wt. % to 7 wt. %, from 11 wt. % to 19 wt. %, from 13 wt. % to 17 wt. %, from 15 wt. % to 20 wt. %, from 8 wt. % to 14 wt. %, or from 5 wt. % to 9 wt. %. By adjusting the total content ratio of the total negative electrode active material contained in the negative electrode active layer and the content ratio of the silicon-based negative electrode active material contained in the total negative electrode active material to the above ranges, the present disclosure can improve the charge capacity per unit mass while reducing the lithium consumption and irreversible capacity loss during activation of the secondary battery. Furthermore, the structural stability of the negative electrode active layer can be improved by minimizing the volume change of the negative electrode active layer during charging and discharging of the secondary battery, thereby improving the life characteristics of the secondary battery.

Furthermore, the carbon-based negative electrode active material and the silicon-based negative electrode active material contained in the negative electrode active layer may have a predetermined average particle diameter ($D_{50}$). Specifically, the average particle diameter ($D_{50}$, Dc) of the carbon-based negative electrode active material may be 5 μm to 50 μm, the average particle diameter ($D_{50}$, Ds) of the silicon-based negative electrode active material may be 0.5

μm to 10 μm, and the average particle diameter ratio (Dc/Ds) of the carbon-based negative electrode active material and the silicon-based negative electrode active material may be 1 to 10.

Specifically, the carbon-based negative electrode active material may exhibit an average particle diameter ($D_{50}$, Dc) of 5 μm to 50 μm, and may be selectively applied within the range to match the average thickness of the negative electrode active layer. For example, the carbon-based negative electrode active material may have an average particle diameter ($D_{50}$) of 5 μm to 40 μm; 5 μm to 30 μm; 10 μm to 40 μm; 15 μm to 30 μm; 25 μm to 50 μm; 11 μm to 19 μm; 15 μm to 25 μm; 20 μm to 30 μm; 5 μm to 20 μm; 5 μm to 10 μm; 5 μm to 15μ; 10μ m to 20μ; 15μ m to 30μ; 15μ m to 20 μm; 21μ m to 26μ; 25μ m to 30μ m; 11μ m to 17 μm; 16μ m to 23 μm; 5μ m to 9 μm; 14μ m to 17 μm; or 16 μm to 19μ m. Spherical carbon-based negative electrode active materials may benefit from a smaller particle diameter to maximize the disorder in the direction of expansion for each particle to prevent the particles from expanding upon charging of lithium ions. However, if the particle diameter of the carbon-based negative electrode active material is less than 5.0 μm, a large amount of binder is required due to the increase in the number of particles per unit volume, and the sphericity and spherization yield may be lower. On the other hand, if the average particle diameter exceeds 50 μm, the expansion rate of the negative electrode active material increases significantly during the charge and discharge of the secondary battery, and thus the cohesion between the negative electrode active material particles decreases; and the cohesion between the negative electrode active material particles and the current collector may decrease as the charge and discharge is repeated, resulting in a significant reduction in the cycle characteristics.

Further, the silicon-based negative electrode active material may exhibit an average particle diameter ($D_{50}$, Ds) of 0.5 μm to 10 μm, more particularly may exhibit an average particle diameter ($D_{50}$) of 0.5 μm to 5 μm; 0.5 μm to 3 μm; 0.5 μm to 2 μm; 0.5 μm to 1 μm; 1 μm to 5 μm; 3 μm to 7 μm; 5 μm to 10 μm; 1 μm to 3 μm; 4 μm to 9 μm; 0.8 μm to 1.2 μm; or 6 μm to 9.5 μm.

When the average particle diameter of the silicon-based negative electrode active material is less than 0.5 μm, it is difficult to uniformly disperse the negative electrode active layer, and as the charging and discharging of the secondary battery proceeds, the redox reactions of the agglomerated and non-agglomerated regions of the silicon-based negative electrode active material are induced unevenly, which may promote the deterioration of the negative electrode active layer. In addition, when the average particle diameter of the silicon-based negative electrode active material exceeds 10 μm, the volume expansion of the silicon-based negative electrode active material increases significantly during charging, thereby lowering the slope of the ab-axis crystal face of the carbon-based negative electrode active material (i.e., increasing the alignment (O.I)), resulting in a significant decrease in the cycling characteristics as the charge and discharge of the secondary battery are repeated.

Further, the average particle diameter ratio (Dc/Ds) of the carbon-based negative electrode active material and the silicon-based negative electrode active material may be from 1 to 10, more specifically from 2 to 7; 2 to 5; 3 to 7; 4 to 8; 5 to 10; 6 to 9; or 1.5 to 4.7.

By satisfying the average particle diameter ratio (Dc/Ds) of the carbon-based negative electrode active material and the silicon-based negative electrode active material in the above range, the present disclosure can induce a structure in which the silicon-based negative electrode active material is filled in the voids formed by the plurality of carbon-based negative electrode active materials. In this case, the void acts as a buffer to buffer the volume expansion of the silicon-based negative electrode active material during charging and discharging of the secondary battery, so that the volume expansion of the negative electrode active layer can be minimized. Furthermore, if the average particle diameter ratio (Dc/Ds) exceeds the upper limit of the above-described range, the deterioration of the negative electrode active layer is accelerated during charging and discharging of the secondary battery, resulting in a shortened life.

Meanwhile, the average thickness of the negative electrode active layer may be from 10 μm to 100 μm, and more specifically, it may be from 20 μm to 90 μm; 50 μm to 90 μm; 80 μm to 90 μm; 40 μm to 70 μm; 55 μm to 68 μm.

Further, the average loading amount of the negative electrode active layer may be from 150 mg/25 $cm^2$ to 300 mg/25 $cm^2$, more specifically from 180 mg/25 cm' to 280 mg/25 $cm^2$; from 180 mg/25 $cm^2$ to 250 mg/25 $cm^2$; from 200 mg/25 $cm^2$ to 250 mg/25 $cm^2$; or from 200 mg/25 $cm^2$ to 220 mg/25 $cm^2$.

By adjusting the average thickness and/or average loading of the negative electrode active layer to the above ranges, the crystalline properties of the negative electrode active material contained in the negative electrode active layer can be easily controlled, and the energy density of the negative electrode can be further increased.

Furthermore, the negative electrode active layer according to the present disclosure may optionally further include, in addition to the negative electrode active material as the main component, conductive materials, binders, other additives, etc. as required.

The conductive material may include one or more among carbon black, acetylene black, ketjen black, carbon nanotubes, carbon fiber, and the like, but is not limited thereto.

In one example, the negative electrode active layer may contain carbon black, carbon nanotubes, carbon fibers, or the like as a conductive material alone or in combination.

In this case, the content of the conductive material may be 0.1 to 10 parts by weight, and more specifically, 0.1 to 8 parts by weight, 0.1 to 5 parts by weight, 0.1 to 3 parts by weight, 2 to 6 parts by weight, or 0.5 to 2 parts by weight with respect to the total of 100 parts by weight of the negative electrode active layer. By controlling the content of the conductive material in the range as described above, the present disclosure can prevent the resistance of the negative electrode from increasing due to a low content of the conductive material, resulting in a decrease in the charging capacity, and the content of the negative electrode active material from decreasing due to an excessive amount of the conductive material, resulting in a decrease in the charging capacity or a decrease in the rapid charging characteristic due to an increase in the loading amount of the negative electrode active layer.

Furthermore, the binder may be suitably applied as a component that assists in the bonding of the negative electrode active material to the conductive material and the like and the bonding to the current collector to the extent that it does not degrade the electrical properties of the electrode, and specifically, may include one or more selected from the group consisting of vinylidene fluoride-hexafluoropropylene copolymer (PVDF-co-HFP), polyvinylidenefluoride (PVdF), polyacrylonitrile, and polymethylmethacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, polyacrylic acid, ethylene-propylene-diene monomer, sulfonated ethylene-propylene-diene monomer, styrene butadiene rubber (SBR), and fluorinated rubber.

The content of the binder may be from 0.1 to 10 parts by weight, and more specifically from 0.1 to 8 parts by weight, from 0.1 to 5 parts by weight, from 0.1 to 3 parts by weight, or from 2 to 6 parts by weight, based on a total of 100 parts by weight of the negative electrode active layer. By controlling the content of the binder contained in the negative electrode active layer to the above range, the present disclosure can prevent the adhesion of the active layer from deteriorating due to a low content of binder or the electrical properties of the electrode from deteriorating due to an excess of binder.

Furthermore, the negative electrode current collector is not particularly limited as long as it has a high conductivity without causing chemical changes in the battery, and for example, copper, stainless steel, nickel, titanium, calcined carbon, and the like can be used, and in the case of copper or stainless steel, those that are surface treated with carbon, nickel, titanium, silver, and the like can also be used. Furthermore, the average thickness of the negative electrode current collector may be suitably applied from 1 to 500 µm, considering the conductivity and total thickness of the negative electrode being manufactured.

Manufacturing Method of a Negative Electrode for Lithium Secondary Battery

In addition, in an exemplary embodiment, the present disclosure provides a manufacturing method of a negative electrode for lithium secondary battery including:

applying a negative electrode slurry including a carbon-based negative electrode active material and a silicon-based negative electrode active material to at least one side of the negative electrode current collector, applying a magnetic field to the applied negative electrode slurry, and drying and rolling a negative electrode slurry applied with a magnetic field to form a negative electrode active layer, wherein the negative electrode active layer has the alignment of the carbon-based negative electrode active material after activation ($O.I_a$) of 3 or less, and satisfies Equation 1 below:

$$0.5 \leq [O.I_a]/[O.I_r] < 1.0 \qquad \text{[Equation 1]}$$

in Equation 1, $O.I_r$ represents the alignment (O.I) of the carbon-based negative electrode active material measured prior to activation, $O.I_a$ represents the alignment (O.I) of the carbon-based negative electrode active material measured after activation, and wherein the alignment (O.I) represents the ratio of the area integrals of the peak at $2\theta=54.7\pm0.2°$, representing the [0,0,4] face, and the peak at $2\theta=77.5\pm0.2°$, representing the [1,1,0] face, in X-ray diffraction spectroscopy analysis of the negative electrode active layer.

A manufacturing method of a negative electrode according to the present disclosure refers to a method of manufacturing the negative electrode of the present disclosure as described above. The method of manufacturing the negative electrode can be carried out by applying a negative electrode slurry on the negative electrode current collector, applying a magnetic field to the surface of the applied negative electrode slurry, and drying and rolling each negative electrode slurry to form a negative electrode active layer.

Here, the step of applying the negative electrode slurry includes coating the surface of the moving negative electrode current collector by discharging a negative electrode slurry containing a carbon-based negative electrode active material. The step above may be applied in any manner conventionally applied in the art without limitation, but preferably may use die coating method. The die coating method may be performed by means of a slot die having a shim for controlling the discharge conditions of the negative electrode slurry. In this case, by controlling the shape of the shim, the loading amount, coating thickness, etc. of the negative electrode slurry applied to the negative electrode current collector can be easily controlled.

Furthermore, the negative electrode slurry may include carbon-based negative electrode active material and silicon-based negative electrode active material as the main components, and may optionally further include conductive materials, binders, other additives, etc. as required. In this case, the carbon-based negative electrode active material and the silicon-based negative electrode active material, as well as the conductive material, binder, other additives, and the like, have the same composition as the composition of the negative electrode for the lithium secondary battery described above, so a detailed description is omitted.

Furthermore, the step of applying a magnetic field to the negative electrode slurry may be a process of controlling the crystal properties of the negative electrode active material contained in the negative electrode slurry to reduce the disorder of the carbon-based negative electrode active material contained in the negative electrode slurry. Specifically, the step may include applying a magnetic field to a surface of the negative electrode slurry applied on the negative electrode current collector to align the ab-axis crystal faces of the carbon-based negative electrode active material contained in each negative electrode slurry at a high angle to the negative electrode current collector.

In this case, the magnetic field application may be applied by magnetic parts disposed on the upper and lower parts of the negative electrode current collector, which is moved with a negative electrode slurry applied to its surface. Furthermore, the polarity of the magnetic parts disposed on the upper and lower parts may be different from each other.

Furthermore, the alignment (O.I) of the carbon-based negative electrode active material contained in the negative electrode slurry can be adjusted by the applied magnetic field strength, the applied time, and the like, so that the step of applying the magnetic field can be performed under the predetermined magnetic field strength and applied time conditions.

Specifically, the step of applying the magnetic field may apply a magnetic field of 10,000 G (Gauss) or less, more specifically, 3,000 G to 9,000 G; 3,000 G to 8,500 G; 3,500 G to 8,500 G; 4,000 G to 8,200 G; 3,600 G to 4,500 G; 4,500 G to 6,500 G; 5,000 G to 7,000 G; 6,000 G to 8,500 G; 7,000 G to 8,500 G; 6,000 G to 6,500 G; 4,000 G to 5,000 G.

Further, the step of applying the magnetic field may be performed for a period of from 1 second to 30 seconds, more specifically, from 1 second to 20 seconds; from 1 second to 15 seconds; from 1 second to 10 seconds; from 5 seconds to 20 seconds; from 10 seconds to 20 seconds; from 11 seconds to 19 seconds; from 14 seconds to 18 seconds; from 4 seconds to 9 seconds; or from 6 seconds to 11 seconds.

In one example, the step of applying the magnetic field may include applying a magnetic field of 4,700±50 G to the negative electrode slurry for 3 to 8 seconds.

In another example, the step of applying the magnetic field may include applying a magnetic field of 4,700±50 G to the negative electrode slurry for 12 seconds to 17 seconds.

Further, the step of applying the magnetic field may be performed by magnetic parts introduced at the upper and lower parts of the applied negative electrode slurry, wherein the size of the magnetic parts is controlled to be larger than the size of the negative electrode slurry. For example, the magnetic parts may have a length ratio of 105% to 200% based on the length in the width direction of the negative electrode slurry, more specifically, 110% to 180%; 110% to 160%; 110% to 140%; 110% to 130%; 130% to 150%; or 105% to 120% based on the length in the width direction of the negative electrode slurry. In this case, the magnetic field applied to the negative electrode slurry is applied uniformly over the entire surface of the negative electrode slurry, which may result in a uniform alignment (O.I) of the carbon-based negative electrode active material.

Furthermore, the step of forming the negative electrode active layer may refer to a process of drying and rolling the negative electrode slurry applied with magnetic field to firmly fix the oriented carbon-based negative electrode active material. Thus, the step of forming the negative electrode active layer may be applied without limitation as long as it is any manner that is capable of maintaining the alignment (O.I) of the carbon-based negative electrode active material contained in the negative electrode active layer.

For example, the drying may be performed by applying thermal energy to the negative electrode slurry using a hot air dryer, a vacuum oven, or the like to dry the negative electrode slurry.

Further, the rolling is a step of increasing the density of the negative electrode active layer by applying pressure to the dried negative electrode slurry using a roll press or the like. In this case, the rolling may be performed under conditions that do not increase the alignment (O.I) of the carbon-based negative electrode active material of the dried negative electrode slurry.

Specifically, the rolling may be performed at a temperature near room temperature, and more specifically, the rolling may be performed at a temperature of 20° C. to 35° C.; 20° C. to 30° C.; or 20° C. to 25° C.

Further, the rolling may be performed at a rolling speed of from 2 m/s to 7 m/s, and more specifically, at a rolling speed of from 2 m/s to 6.5 m/s; from 2 m/s to 6 m/s; from 2 m/s to 5.5 m/s; from 2 m/s to 5 m/s; from 2 m/s to 4.5 m/s; from 2 m/s to 4 m/s; from 2.5 m/s to 4 m/s; from 2.5 m/s to 3.5 m/s; from 3.5 m/s to 5 m/s; from 5 m/s to 7 m/s; from 5.5 m/s to 6.5 m/s; or from 6 m/s to 7 m/s.

Furthermore, the rolling may be performed under a pressure condition of 50 MPa to 200 MPa, more specifically, under a pressure condition of 50 MPa to 150 MPa; 50 MPa to 100 MPa; 100 MPa to 200 MPa; 150 MPa to 200 MPa; or 80 MPa to 140 MPa.

By performing the rolling of the dried negative electrode slurry under the above temperature, speed and/or pressure conditions, the present disclosure can increase the energy density of the negative electrode while minimizing the change in the alignment of the carbon-based negative electrode active material contained in the negative electrode active layer formed.

As an example, the negative electrode active layer formed by the above conditions may have minimal changes in the alignment of the carbon-based negative electrode active material, such that the alignment of the carbon-based negative electrode active material after rolling ($O.I_r$) may be 5 or less, and may satisfy Equation 2 below:

$$0.1 \leq [O.I_c]/[O.I_r] \leq 0.7 \qquad \text{[Equation 2]}$$

in Equation 2, $O.I_c$ represents the alignment (O.I) of the carbon-based negative electrode active material measured prior to rolling of the negative electrode active layer, $O.I_r$ represents the alignment (O.I) of the carbon-based negative electrode active material measured after the rolling of the negative electrode active layer, and wherein the alignment (O.I) represents the ratio of the area integrals of the peak at 2θ=54.7±0.2°, representing the [0,0,4] face, and the peak at 2θ=77.5±0.2°, representing the [1,1,0] face, in X-ray diffraction spectroscopy analysis of the negative electrode active layer.

Specifically, the negative electrode active layer may have an alignment ($O.I_r$) of the carbon-based negative electrode active material after rolling of 4.5 or less, 4.0 or less, 1.0 to 4.0, 2.0 to 4.0, 2.0 to 3.5, 2.0 to 3.0, 2.0 to 3.0, 3.0 to 4.0, 3.0 to 3.5, 1.8 to 2.5, or 1.8 to 3.4.

Furthermore, the negative electrode active layer may satisfy Equation 2 representing the alignment ratio ($O.I_c/O.I_r$) of the carbon-based negative electrode active material before and after rolling from 0.1 to 0.7 (i.e., 0.1≤[$O.I_c$]/[$O.I_r$]≤0.7), more specifically, 0.1 to 0.65 (i.e., 0.1≤[$O.I_c$]/[$O.I_r$]≤0.65); 0.3 to 0.65 (i.e., 0.3≤[$O.I_c$]/[$O.I_r$]≤0.65); 0.4 to 0.65 (i.e., 0.4≤[$O.I_c$]/[$O.I_r$]≤0.65); 0.50 to 0.63 (i.e., 0.50≤[$O.I_c$]/[$O.I_r$]≤0.63); 0.45 to 0.55 (i.e., 0.45≤[$O.I_c$]/[$O.I_r$]≤0.55); or 0.55 to 0.65 (i.e., 0.55≤[$O.I_c$]/[$O.I_r$]≤0.65).

The method of manufacturing a negative electrode for a lithium secondary battery according to the present disclosure has the above-described configuration, which enables manufacturing a negative electrode having excellent charge and discharge capacity and energy density, and high charge characteristics and life characteristics during long-term charging and discharging of the secondary battery.

Lithium Secondary Battery

Furthermore, in an exemplary embodiment, the present disclosure provides a lithium secondary battery including an electrode assembly including a positive electrode, the above-described negative electrode of the present disclosure, and a separator disposed between the positive electrode and negative electrode.

The lithium secondary battery according to the present disclosure includes an electrode assembly having a structure in which a plurality of positive electrodes and a plurality of negative electrodes are arranged alternately, and a separator is positioned between them. The lithium secondary battery having the negative electrode of the present disclosure described above has excellent charge and discharge capacity and energy density, and excellent charge and discharge characteristics and life characteristics even under long-term charging and discharging, and is therefore useful as a power source for medium and large devices such as electric vehicles.

In this case, the negative electrode has the same configuration as the configuration described above, so the specific description is omitted.

Further, the positive electrode may include a positive electrode active layer including a positive electrode active material on the positive electrode current collector, the positive electrode active layer optionally further including a conductive material, a binder, other additives, and the like as required.

The positive electrode active material may include one or more of the lithium metal oxides represented by Chemical Formula 1 and Chemical Formula 2 below, which are capable of reacting electrochemically on the positive electrode current collector to reversibly intercalate and deintercalate lithium ions:

$$Li_x[Ni_yCO_zMn_wM^1{}_v]O_2 \quad \text{[Chemical Formula 1]}$$

$$LiM^2{}_pMn_{1-p}O_4 \quad \text{[Chemical Formula 2]}$$

in Chemical Formula 1 and Chemical Formula 2,
- $M^1$ is at least one element of W, Cu, Fe, V, Cr, Ti, Zr, Zn, Al, In, Ta, Y, La, Sr, Ga, Sc, Gd, Sm, Ca, Ce, Nb, Mg, B, or Mo,
- x, y, z, w, and v are $1.0 \le x \le 1.30$, $0.5 \le y < 1$, $0 < z \le 0.3$, $0 < w \le 0.3$, and $0 \le v \le 0.1$, respectively, where $y+z+w+v=1$,
- $M^2$ is Ni, Co, or Fe, and
- p is $0.05 \le p \le 1.0$
- q is 2−p,
- r is 0 to 1.

Lithium metal oxides, represented by Chemical Formula 1 and Chemical Formula 2, are materials containing a high content of nickel (Ni) and manganese (Mn), respectively, and when used as a positive electrode active material, have the advantage of being able to stably supply high capacity and/or high voltage electricity compared to conventionally used positive electrode active materials such as lithium iron phosphate ($LiFeO_4$).

In this case, the lithium metal oxide represented by Chemical Formula 1 may include $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$, and the like, and the lithium metal oxide represented by Chemical Formula 2 may include $LiNi_{0.7}Mn_{1.3}O_4$; $LiNi_{0.5}Mn_{1.5}O_4$; $LiNi_{0.3}Mn_{1.7}O_4$; and the like, which may be used alone or in combination.

Furthermore, the positive electrode active material may be included in an amount of at least 85 parts by weight based on the weight of the positive electrode active layer, and more specifically may be included in an amount of at least 90 parts by weight, at least 93 parts by weight, or at least 95 parts by weight.

Furthermore, the positive electrode active layer may further include a conductive material, a binder, other additives, etc. in addition to the positive electrode active material.

In this case, the conductive material used to improve the electrical performance of the positive electrode may be any material conventionally used in the art, but more particularly may include at least one type selected from the group consisting of natural graphite, synthetic graphite, carbon black, acetylene black, denka black, ketjen black, super-P, channel black, furnace black, lamp black, summer black, graphene, and carbon nanotubes.

Furthermore, the conductive material may be included in an amount of 0.1 to 5 parts by weight based on a total of 100 parts by weight of each positive electrode active layer, more specifically 0.1 to 4 parts by weight; 2 to 4 parts by weight; 1.5 to 5 parts by weight; 1 to 3 parts by weight; 0.1 to 2 parts by weight; or 0.1 to 1 part by weight based on the total of 100 parts by weight of each positive electrode active layer.

Furthermore, the binder serves to bind the positive electrode active material, positive electrode additive, and conductive material to each other, and may be used without limitation as long as it has this function. Specifically, the binder may include one or more resins selected from the group consisting of polyvinylidene fluoride-hexafluoropropylene copolymer (PVdF-co-HFP), polyvinylidenefluoride (PVdF), polyacrylonitrile, polymethylmethacrylate, and copolymers thereof. In one example, the binder may include polyvinylidenefluoride.

Additionally, the binder may be included in an amount of 1 to 10 parts by weight based on a total of 100 parts by weight of each positive electrode active layer. More particularly, the binder may be included in the amount of 2 to 8 parts by weight; or 1 to 5 parts by weight based on the total of 100 parts by weight of each positive electrode active layer.

The total thickness of the positive electrode active layer is not particularly limited, but may be from 50 μm to 300 μm, more specifically from 100 μm to 200 μm; from 80 μm to 150 μm; from 120 μm to 170 μm; from 150 μm to 300 μm; from 200 μm to 300 μm; or from 150 μm to 190 μm.

Furthermore, as a positive electrode current collector, the positive electrode may use one with a high conductivity without causing chemical changes in the battery. For example, stainless steel, aluminum, nickel, titanium, calcined carbon, and the like can be used, and in the case of aluminum or stainless steel, those that are surface treated with carbon, nickel, titanium, silver, and the like can also be used. Furthermore, the average thickness of the current collector may be suitably applied from 3 to 500 μm, considering the conductivity and total thickness of the positive electrode to be manufactured.

Furthermore, the separator interposed between the positive electrode and the negative electrode of each unit cell is an insulating thin film having high ion permeability and mechanical strength, and it is particularly limited as long as it is those conventionally used in the art, but may include one or more polymers such as chemically resistant and hydrophobic polypropylene; polyethylene; polyethylene-propylene copolymers. The separator may be in the form of a porous polymeric substrate, such as a sheet or nonwoven fabric including the polymer described above, and in some cases may be in the form of a composite separator in which organic or inorganic particles are coated by an organic binder on the porous polymeric substrate. Furthermore, the separator may have an average pore diameter of 0.01 to 10 μm, and an average thickness of 5 to 300 μm.

Meanwhile, the lithium secondary battery according to the present disclosure may be shaped, without being particularly limited, to include a stack-type; a zigzag-type; or a zigzag-stack-type electrode assembly. As one example, the lithium secondary battery according to the present disclosure may be a pouch-type secondary battery or a prismatic secondary battery.

A pouch-type and/or a prismatic secondary battery have the advantage of being highly utilizable in terms of energy density, as they can pack a high density of secondary batteries within a limited space.

Manufacturing Method of Lithium Secondary Battery

Further, the present disclosure provides, in one embodiment, a method of manufacturing the above-described lithium secondary battery.

A method of manufacturing a lithium secondary battery according to the present disclosure includes: inserting an electrode assembly including a positive electrode, the negative electrode of the present disclosure, and a separator disposed between the positive electrode and negative electrode into a battery case, injecting a non-aqueous electrolyte, and activating the assembled lithium secondary battery.

The step of activating may refer to electrically activating the lithium secondary battery and providing a pathway for the migration of lithium ions into the negative electrode active layer during charge and discharge.

Here, the present disclosure can be carried out under certain conditions to ensure that the slope of the ab-axis crystal face of the carbon-based negative electrode active material contained in the negative electrode active layer with respect to the negative electrode current collector during activation of the secondary battery provides a path for the migration of lithium ions with minimal damage and/or loss.

Specifically, the activation step may perform two or more charge and discharge cycles under a constant current condition of less than 1 C rate. More specifically, the activation step may perform the charge and discharge under a constant current condition of a C rate of 0.01 C to 0.9 C; 0.01 C to 0.75 C; 0.01 C to 0.5 C; 0.05 C to 0.5 C; or 0.05 C to 0.3 C. Further, the activation step may perform the charge and discharge at least two times, at least three times, at least four times, at least two to five times, or at least two to four times.

By performing multiple charge and discharge cycles at a low current density of less than 1 C during activation of a secondary battery, the present disclosure can secure a migration path for lithium ions while minimizing changes in the alignment of the ab-axis crystal face of the carbon-based negative electrode active material contained in the negative electrode active layer. The migration path of the lithium ions thus secured can reduce the contraction and expansion of the carbon-based negative electrode active material and the silicon-based negative electrode active material during charge and discharge after activation. Accordingly, the lithium secondary battery of the present disclosure can exhibit excellent charge and discharge characteristics and life characteristics because the change can maintain a high orientation of the ab-axis crystal face of the carbon-based negative electrode active material even when charge and discharge are performed over a long period of time.

Hereinafter, the present disclosure will be described in more detail by way of examples and experimental examples.

However, the following examples and experimental examples are illustrative of the present disclosure, and the disclosure is not limited to the following examples and experimental examples.

Examples 1 to 3 and Comparative Examples 1 to 6. Preparation of Lithium Secondary Battery Preparation of Negative Electrode As a carbon-based negative electrode active material, natural graphite (average particle diameter ($D_{50}$): 18±1 μm) and synthetic graphite (average particle diameter ($D_{50}$): 16±1 μm) were prepared, and as a silicon-based negative electrode active material, silicon oxide ($SiO_2$) was prepared, respectively, and a negative electrode slurry was prepared using the prepared carbon-based negative electrode active material and silicon-based negative electrode active material.

Specifically, a negative electrode active material was prepared by mixing mixed graphite (average particle diameter ($D_{50}$): about 17 μm) of natural and synthetic graphite in a weight ratio of 15 to 25:75 to 85 and silicon oxide ($SiO_2$) in the weight ratio as shown in Table 1 below. A negative electrode slurry was prepared by mixing 95 parts by weight of the prepared negative electrode active material, 1 part by weight of carbon black as a conductive material, 1.5 parts by weight of carboxymethylcellulose (CMC) as a binder, and 2.5 parts by weight of styrene butadiene rubber (SBR) with water to achieve 50% solid content.

Once the negative electrode slurry was prepared, it was cast onto a copper thin plate (thickness: 10 μm) under roll-to-roll transfer (transfer speed: 5 m/min) using a dual die coater. At this time, the loading amount of the applied negative electrode slurry was 208~210 mg/25 $cm^2$.

Permanent magnets with a length ratio of 110-120% based on the length of the negative electrode slurry in the width direction were placed on the upper part of the applied negative electrode slurry and the lower part of the negative electrode current collector, and a magnetic field was applied at a field strength of 4,700 G for the time shown in Table 1. The negative electrode slurry applied with a magnetic field was hot air dried to form a negative electrode active layer with carbon-based negative electrode active material oriented on the negative electrode current collector. X-ray diffraction (XRD) spectroscopy analysis was performed on the formed negative electrode active layer to measure the spectra. The measurement conditions for X-ray diffraction were as follows:

Target: Cu (Kα-ray) graphite monochromator

Slit: Divergence slit=1 degree, Receiving slit=0.1 mm, Scatter slit=1 degree

Measurement zone: (1,1,0) face: 76.5 degrees<2θ<78.5 degrees/(0,0,4) face: 53.5 degrees<2θ<56.0 degrees.

The formed negative electrode active layer was then rolled at a pressure of 100-150 MPa and a transfer rate of 3 m/s at 22±1° C. to prepare negative electrodes for lithium secondary batteries (average thickness of the negative electrode active layer before rolling: 87-88 μm/average thickness after rolling: 58-66 μm). X-ray diffraction (XRD) spectroscopy analysis was further performed on the rolled negative electrode active layer to measure the spectra.

Using Equation 3 below, the alignment (O.I) of the mixed graphite was calculated from the spectra measured before and after rolling, respectively, and the results are shown in Table 1 below.

$$O.I = I_{004} / I_{110} \qquad \text{[Equation 3]}$$

In Equation 3, $I_{004}$ represents the area of the peak representing the [0,0,4] crystal face in an X-ray diffraction spectroscopy (XRD) measurement of the negative electrode active layer, and $I_{110}$ represents the area of the peak representing the [1,1,0] crystal face in an X-ray diffraction (XRD) measurement of the negative electrode active layer.

TABLE 1

| | Mixed graphite content (parts by weight) | Silicon oxide content (parts by weight) | Silicon oxide Average particle diameter (μm) | Dc/Ds | Magnetic field application time | Alignment of mixed graphite Before rolling (O.I.) | Alignment of mixed graphite After rolling (O.I.) |
|---|---|---|---|---|---|---|---|
| Example 1 | 94 | 6 | 6 | 2.83 | 6 sec. | 2.03 | 3.31 |
| Example 2 | 94 | 6 | 6 | 2.83 | 15 sec. | 1.15 | 2.24 |
| Example | 94 | 6 | 6 | 2.83 | 15 sec. | 1.15 | 2.24 |
| Comparative Example 1 | 94 | 6 | 6 | 2.83 | 0 sec. | 5.94 | 8.72 |
| Comparative Example 2 | 100 | 0 | 6 | 2.83 | 15 sec. | 0.95 | 2.45 |
| Comparative Example 3 | 75 | 25 | 6 | 2.83 | 15 sec. | 2.87 | 4.68 |
| Comparative Example 4 | 94 | 6 | 1 | 17 | 15 sec. | 1.07 | 3.18 |
| Comparative Example 5 | 94 | 6 | 18 | 0.94 | 15 sec. | 2.41 | 3.87 |
| Comparative Example 6 | 94 | 6 | 6 | 2.83 | 15 sec. | 1.15 | 2.24 |

Preparation of Positive Electrode $LiNi_{0.7}Co_{0.1}Mn_{0.1}Al_{0.1}O_2$ with a particle size of 5 μm was prepared as a positive electrode active material, mixed with a carbon-based conductive material and polyvinylidene fluoride as a binder in a weight ratio of 94:3:3 in N-methyl pyrrolidone (NMP) to form a positive electrode slurry, and applied to an aluminum thin plate. The positive electrode slurry was then dried in a 120° C. vacuum oven and rolled to prepare a positive electrode (average thickness of the positive electrode active layer: 100±10 μm).

Preparation of Lithium Secondary Battery

An electrode assembly was manufactured by interposing a separator comprising 18 μm of polypropylene between the positive electrode obtained above and the negative electrode prepared in Examples 1-3 and Comparative Examples 1-6, respectively. The manufactured electrode assembly was inserted into a case, and a lithium secondary battery was assembled by injecting a non-aqueous electrolyte composition into the case.

The assembled lithium secondary batteries were subjected to activation at 22±1° C. to prepare lithium secondary batteries. The activation was performed under constant current conditions with the current densities shown in Table 2 below.

The negative electrodes were disassembled from each activated lithium secondary battery to perform X-ray diffraction (XRD) spectroscopic analysis of the negative electrode active layer. The X-ray diffraction (XRD) conditions were identical to those previously performed. From the measured X-ray diffraction spectra, an alignment ($O.I._a$) of the mixed graphite was calculated. In addition, the ratio of the alignment of the carbon-based negative electrode active material of the activated negative electrode ($O.I._a$) to the alignment of the carbon-based negative electrode active material of the negative electrode before activation ($O.I._r$) was calculated. The results are shown in Table 2 below.

TABLE 2

| | Activation conditions Current density | Activation conditions Number of charge/discharge cycles | Alignment of mixed graphite $O.I._a$ | Alignment of mixed graphite $O.I._a/O.I._r$ |
|---|---|---|---|---|
| Example 1 | 0.1 C | 2 | 2.46 | 0.74 |
| Example 2 | 0.1 C | 2 | 2.00 | 0.89 |
| Example 3 | 0.1 C | 1 | 1.87 | 0.83 |
| Comparative Example 1 | 0.1 C | 2 | 9.91 | 1.14 |
| Comparative Example 2 | 0.1 C | 2 | 2.48 | 1.01 |
| Comparative Example 3 | 0.1 C | 2 | 4.97 | 1.06 |
| Comparative Example 4 | 0.1 C | 2 | 3.21 | 1.01 |
| Comparative Example 5 | 0.1 C | 2 | 3.94 | 1.02 |
| Comparative Example 6 | 1 C | 2 | 5.27 | 2.35 |

Experimental Example

To confirm the performance of the negative electrode according to the present disclosure, the initial charge and discharge capacities and life characteristics were evaluated for the lithium secondary batteries prepared in Examples 1 to 3 and Comparative Examples 1 to 6.

Specifically, one charge and discharge cycle was performed once for each of the lithium secondary batteries activated in Examples 1 to 3 and Comparative Examples 1 to 6. The charging was performed by charging at a constant current (CC) of 1.0 C at a temperature of 25° C. until 5 mV, followed by charging at a constant voltage (CV) until the charging current was 0.005 C (cut-off current). After being left for 20 minutes after charging, the discharging was performed at a constant current (CC) of 1.0 C at a temperature of 25° C. until 1.5 V. The capacity of each lithium secondary battery was measured during charging and discharging, and the measured charge and discharge capacities were determined to be the initial charge and discharge capacities of each lithium secondary battery. The results are shown in Table 3 below.

For each lithium secondary battery with a measured initial charge and discharge capacity, 299 charge and discharge cycles were performed under the same conditions. At the end of the 299th charge and discharge, the charge and discharge capacities of each lithium secondary battery were measured. The measured charge and discharge capacities were determined to be the 300th charge and discharge capacities for each lithium secondary battery, and the capacity retention rate was calculated based on the initial charge and discharge capacity. The results are shown in Table 3 below.

TABLE 3

|  | Initial charge capacity [mAh/g] | Initial discharge capacity [mAh/g] | Capacity retention rate (@300 cycle) |
|---|---|---|---|
| Example 1 | 461 | 398 | 90.5% |
| Example 2 | 463 | 400 | 91.2% |
| Example 3 | 463 | 400 | 87.3% |
| Comparative Example 1 | 460 | 397 | 78.2% |
| Comparative Example 2 | 344 | 296 | 88.6% |
| Comparative Example 3 | 498 | 434 | 75.1% |
| Comparative Example 4 | 462 | 399 | 84.9% |
| Comparative Example 5 | 460 | 396 | 76.8% |
| Comparative Example 6 | 461 | 397 | 83.4% |

As shown in Table 3, it can be seen that the negative electrode according to the present disclosure has an excellent charge and discharge capacity and excellent life characteristics.

Specifically, the lithium secondary batteries of the examples have a configuration in which ① the alignment ($O.I_a$) of the carbon-based negative electrode active material after activation is controlled to be 3 or less, and ② the alignment ratio ($O.I_a/O.I_r$) of the carbon-based negative electrode active material after activation and before activation is controlled to be 0.5 or more and less than 1. Accordingly, the above lithium secondary batteries have a charge capacity and a discharge capacity of more than 461 mAh/g and more than 398 mAh/g, respectively, at initial charge and discharge, and a capacity retention rate of more than 87% after 300 cycles of charge and discharge.

On the other hand, the lithium secondary batteries of the comparative examples do not include all of the above configurations and therefore have lower initial charge and discharge capacities than the examples or, even if equivalent, has been confirmed to have a significantly lower capacity retention rate after 300 cycles of charge and discharge.

This indicates that the negative electrodes of the examples have a high charge and discharge capacity and energy density by including a carbon-based negative electrode active material and a silicon-based negative electrode active material together. Furthermore, the negative electrodes secure the migration path of lithium ions in the negative electrode active layer during activation, which means that even if a long-term charge and discharge of the secondary battery is performed, the contraction and expansion of the negative electrode active material due to the intercalation and deintercalation of lithium ions is suppressed, and the damage and/or loss of the alignment (O.I) of the carbon-based negative electrode active material is minimized.

From these results, it can be seen that the negative electrode for a lithium secondary battery according to the present disclosure has excellent charging characteristics and life characteristics during long-term charge and discharge.

Although the above has been described with reference to a preferred exemplary embodiment of the present disclosure, it will be understood by those skilled in the art or having ordinary knowledge of the art that various modifications and changes can be made to the present disclosure without departing from the ideas and technical scope of the present disclosure described in the following claims.

Accordingly, the technical scope of the present disclosure is not limited to what is described in the detailed description of the specification, but should be defined by the patent claims.

The invention claimed is:

1. A negative electrode for a lithium secondary battery, comprising:
   a negative electrode current collector, and
   a negative electrode active layer provided on at least one side of the negative electrode current collector and including a carbon-based negative electrode active material after activation and a silicon-based negative electrode active material,
   wherein the negative electrode active layer has an alignment $O.I_a$ of the carbon-based negative electrode active material after activation of 3 or less, and satisfies Equation 1:

$$0.5 \leq O.I_a/O.I_r < 1.0 \quad \text{[Equation 1]}$$

wherein, in Equation 1,
   $O.I_r$ represents the alignment of the carbon-based negative electrode active material measured prior to activation,
   the activation is defined by charging and discharging the lithium secondary battery including the negative electrode at least two times at a rate of less than 1 C rate, and
   the alignment of the carbon-based negative electrode active material prior to activation or after activation represents a ratio of area integrals of a peak at . . . analysis of the negative electrode active layer.

2. The negative electrode of claim 1, wherein an average particle diameter (Dc) of the carbon-based negative electrode active material is between 5 μm and 50 μm,
   an average particle diameter (Ds) of the silicon-based negative electrode active material is between 0.5 μm and 10 μm, and
   an average particle diameter ratio (Dc/Ds) of the carbon-based negative electrode active material and silicon-based negative electrode active material ranges from 1 to 10.

3. The negative electrode of claim 1, wherein the silicon-based negative electrode active material is included in an amount ranging from 1 wt. % to 20 wt. % based on a total weight of the negative electrode active material.

4. The negative electrode of claim 1, wherein the carbon-based negative electrode active material includes one or more of natural graphite or synthetic graphite.

5. The negative electrode of claim 1, wherein the silicon-based negative electrode active material includes one or more of silicon (Si), silicon carbide (SiC), or silicon oxide ($SiO_q$, where $0.8 \leq q \leq 2.5$).

6. The negative electrode of claim 1, wherein the negative electrode active layer has a loading amount ranging from 150 mg/25 cm² to 300 mg/25 cm².

7. The negative electrode of claim 1, wherein the negative electrode active layer has an average thickness ranging from 10 μm to 100 μm.

8. A lithium secondary battery provided with an electrode assembly, comprising:
a positive electrode,
the negative electrode of claim 1, and
a separator disposed between the positive electrode and the negative electrode.

9. The lithium secondary battery of claim 8, wherein the positive electrode comprises a positive electrode current collector, and a positive electrode active layer provided on at least one side of the positive electrode current collector and including at least one positive electrode active material represented by Chemical Formula 1 or Chemical Formula 2:

$$Li_x[Ni_yCO_zMn_wM^1_v]O_2 \quad \text{[Chemical Formula 1]}$$

$$LiM^2_pMn_{1-p}O_4 \quad \text{[Chemical Formula 2]}$$

wherein, in Chemical Formula 1 and Chemical Formula 2,
$M^1$ is at least one element of W, Cu, Fe, V, Cr, Ti, Zr, Zn, Al, In, Ta, Y, La, Sr, Ga, Sc, Gd, Sm, Ca, Ce, Nb, Mg, B, or Mo,
x, y, z, w, and v are $1.0 \leq x \leq 1.30$, $0.5 \leq y < 1$, $0 < z \leq 0.3$, $0 < w \leq 0.3$, and $0 \leq v \leq 0.1$, respectively, where $y+z+w+v=1$,
$M^2$ is Ni, Co, or Fe, and
p is $0.05 \leq p \leq 1.0$.

10. A manufacturing method of a lithium secondary battery, comprising:
activating a lithium secondary battery including an electrode assembly comprising a positive electrode, the negative electrode of claim 1, and a separator disposed between the positive electrode and the negative electrode.

11. The method of claim 10, wherein the activating is performed by charging and discharging the lithium secondary battery at least two times at a rate ranging from 0.01 C to 0.9 C.

* * * * *